United States Patent

Mori

[11] Patent Number: 5,540,477
[45] Date of Patent: Jul. 30, 1996

[54] WINDOW MOLDING FOR A VEHICLE

[75] Inventor: Kazuo Mori, Chiryu, Japan

[73] Assignee: Aisin Seiki Kabushiki Kaisha, Kariya, Japan

[21] Appl. No.: 133,869

[22] Filed: Oct. 12, 1993

[30] Foreign Application Priority Data

Oct. 15, 1992 [JP] Japan .................................. 4-277563

[51] Int. Cl.⁶ ........................................................ B60J 1/02
[52] U.S. Cl. ................... 296/146.15; 52/204.591; 296/93; 296/96.21
[58] Field of Search ................... 296/146.15, 93, 296/96.21, 208; 52/393, 397

[56] References Cited

U.S. PATENT DOCUMENTS

| 5,039,157 | 8/1991 | Yada .......................... 296/93 |
| 5,154,471 | 10/1992 | Mimura et al. .............. 296/93 |
| 5,174,623 | 12/1992 | Yada et al. .................. 296/93 |
| 5,178,919 | 1/1993 | Mimura et al. ......... 296/93 X |
| 5,297,843 | 3/1994 | Yada et al. ............. 296/146.15 |

FOREIGN PATENT DOCUMENTS

| 206718 | 10/1985 | Japan .................. 296/146.15 |
| 1-223018 | 9/1989 | Japan . |
| 3-128721 | 5/1991 | Japan . |

*Primary Examiner*—David M. Mitchell
*Assistant Examiner*—Kia M. Robinson
*Attorney, Agent, or Firm*—Burns, Doane, Swecker & Mathis, L.L.P.

[57] ABSTRACT

A window molding for a vehicle includes a main portion disposed between a vehicle body and a vehicle window, an ornament portion connected with the main portion along the length of the main portion and for covering between the vehicle body and the vehicle window, a lip portion which is connected with the main portion so as to form a groove with the ornament portion and a projection portion disposed on one end portion of the groove which gradually increases in the direction of the one end of the groove so as to fill the groove.

2 Claims, 5 Drawing Sheets

WINDOW MOLDING FOR A VEHICLE

BACKGROUND OF THE INVENTION

1. Field of the Invention

This invention relates to a window molding for a vehicle and to a machine for making a vehicle window molding.

2. Description of the Related Art

A conventional window molding for a vehicle is disclosed in the Japanese Patent Laid Open No. 3(1991)-128721. The window molding for a vehicle disclosed in the prior art comprises a main portion, a leg portion connected with the main portion which supports a window glass, a lip portion formed with the main portion which contacts the window glass and a panel lip which contacts a vehicle body. The window molding further comprises a groove for removal of rain water which is disposed between the main portion and the lip portion. The length of the lip portion is gradually reduced along the upper direction of the side molding of the window molding. Therefore a width (identified as W in FIG. 3 of the prior art) of the groove is also reduced along in the upper direction of the side molding.

However a depth of the groove of the window molding is constant. Therefore, when the vehicle runs, a noise is generated by air which passes over the window.

In the prior art a molding machine which extrudes the above window molding is disclosed. The molding machine comprises a molding die, a first shutter and a second shutter. The first shutter includes an opening which is shaped in the same configuration as a lower portion of the window molding. When the window molding is molded, the first shutter is slid upwardly. Therefore the length of the lip portion is gradually reduced along the length of the side molding.

However the molding machine cannot be applied to a window molding which needs means for attaching an ornament portion to a main portion.

SUMMARY OF THE PRESENT INVENTION

It is an object of the present invention to provide an improved window molding which decreases the noise which is generated by air passing over the window.

It is another object of the present invention to provide an improved window molding which can be mounted on a vehicle easily.

It is a further object of the present invention to provide an improved window molding which can provide a complete seal between a body and a window of a vehicle.

It is a further object of the present invention to provide an improved window molding which is simple in structure.

It is a further object of the present invention to provide an improved window molding which is available for any kind of vehicle.

It is a further object of the present invention to provide an improved window molding which is small in size.

It is a further object of the present invention to provide an improved window molding which is low in cost.

It is a further object of the present invention to provide an improved molding machine which molds the above window molding.

To achieve the above mentioned objects, a window molding for a vehicle in accordance with this invention comprises a main portion disposed between a vehicle body and a vehicle window, an ornament portion connected with the main portion along the length of the main portion and for covering between the vehicle body and the vehicle window, a lip portion which is connected with the main portion so as to form a groove with the ornament portion and a projection portion disposed on one end portion of the groove which gradually increases in the direction of the one end of the groove so as to fill the groove.

BRIEF DESCRIPTION OF THE DRAWINGS

The features and advantages of the window molding for a vehicle according to the present invention will be more clearly appreciated from the following description in conjunction with the accompanying drawings wherein.

DETAILED DESCRIPTION OF PREFERRED EMBODIMENT OF THE INVENTION

Figure 1:
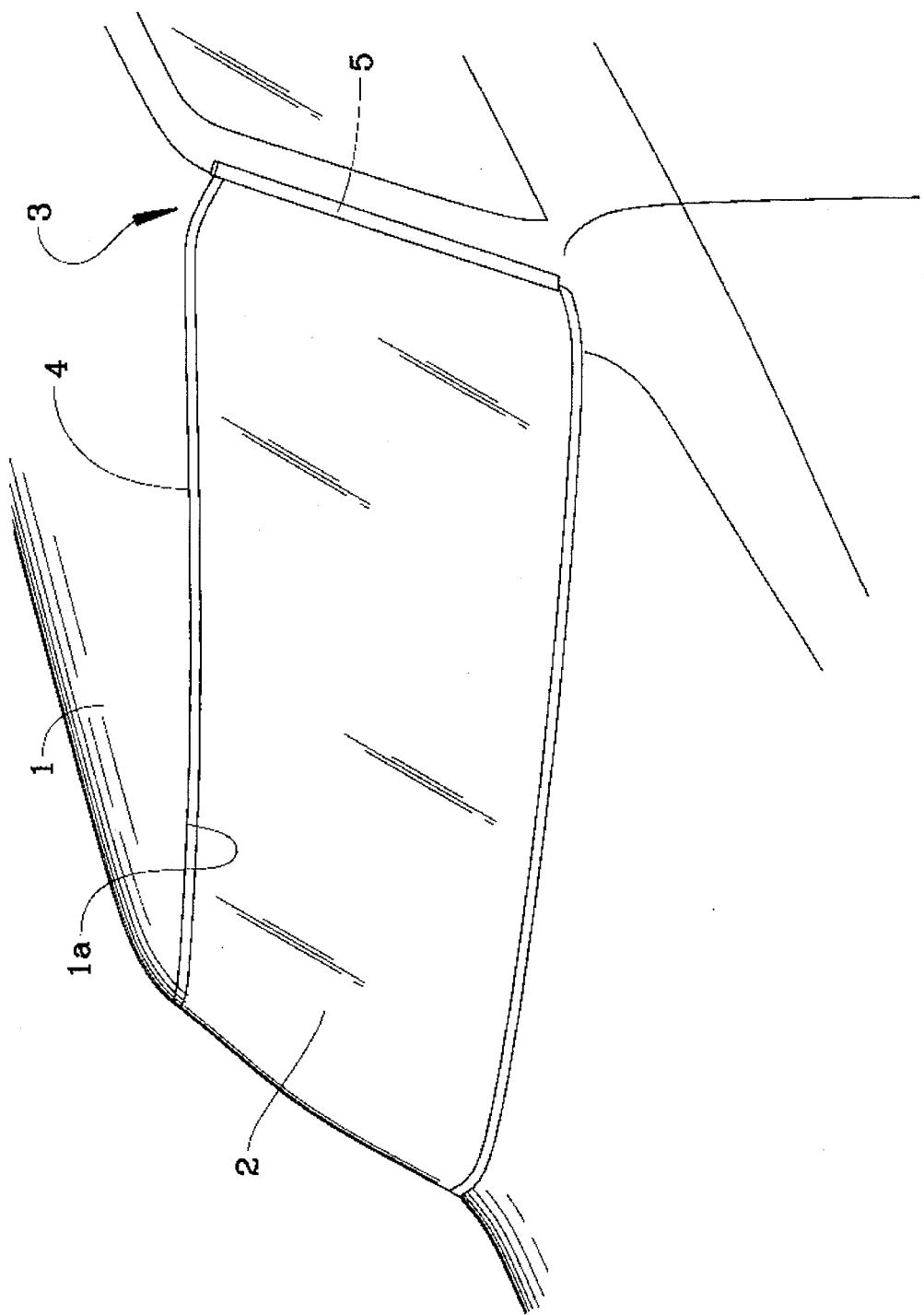
FIG. 1 is a perspective view of a window molding constructed in accordance with the present invention mounted on a vehicle.
Figure 2:
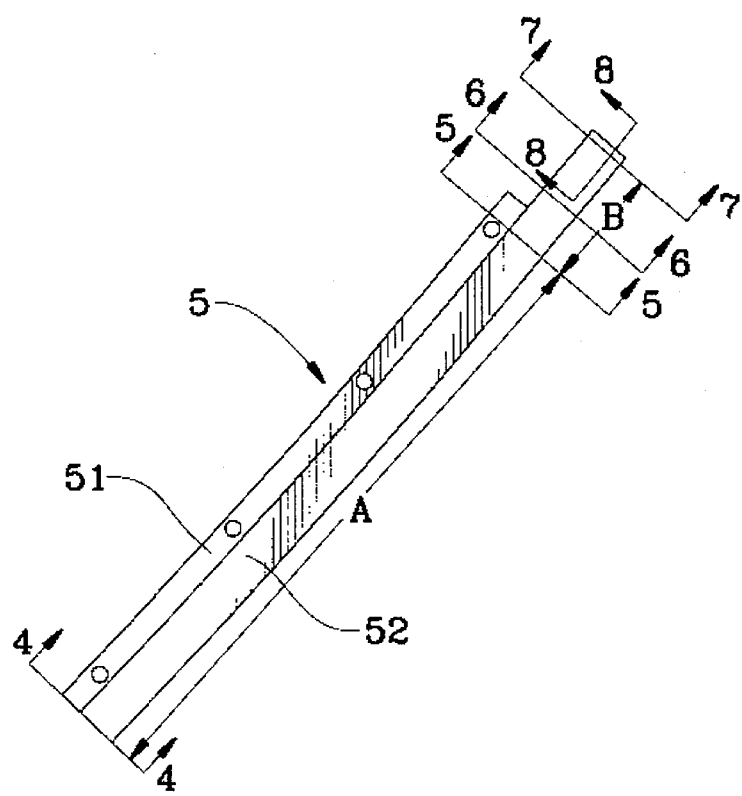
FIG. 2 is a plan view of a window molding for a vehicle constructed in accordance with the present invention.
Figure 3:
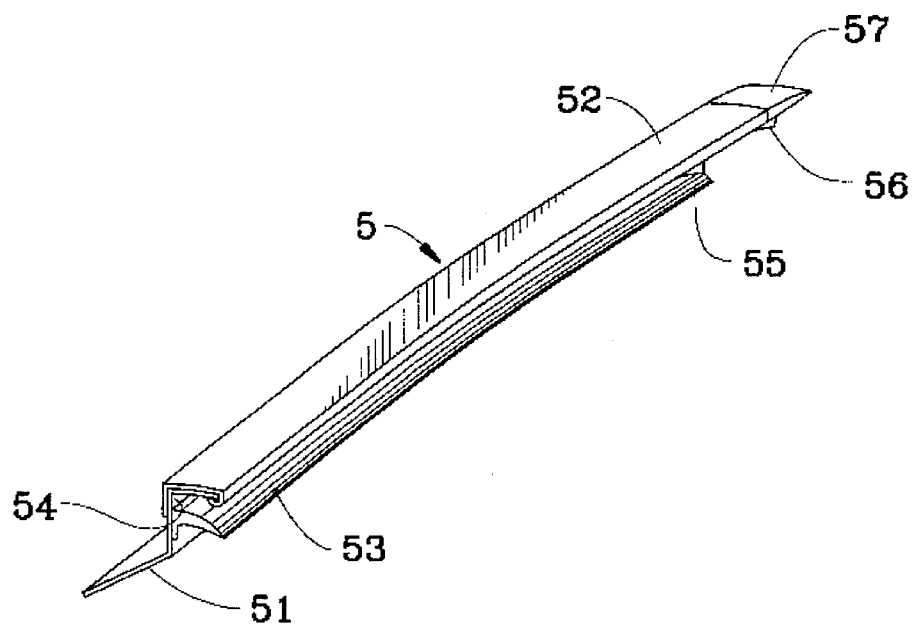
FIG. 3 is an enlarged perspective view of a portion of a window molding for a vehicle, constructed in accordance with the present invention.
Figure 4:
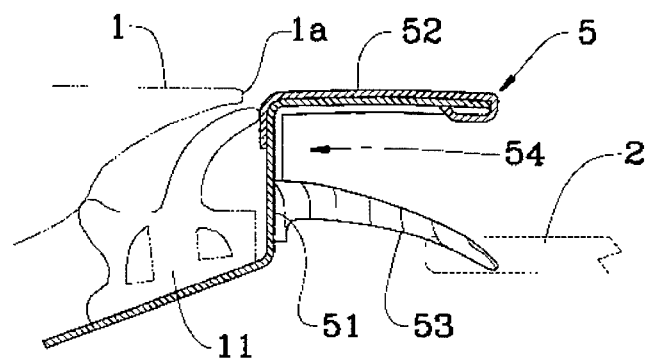
FIG. 4 is a sectional view of a window molding for a vehicle taken on line 4—4 of FIG. 2.
Figure 5:
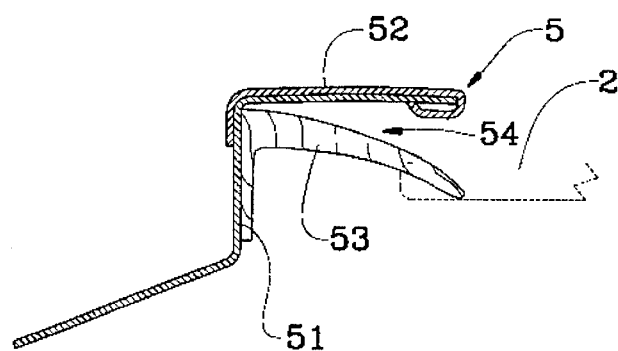
FIG. 5 is a sectional view of a window molding for a vehicle taken on line 5—5 of FIG. 2.
Figure 6:
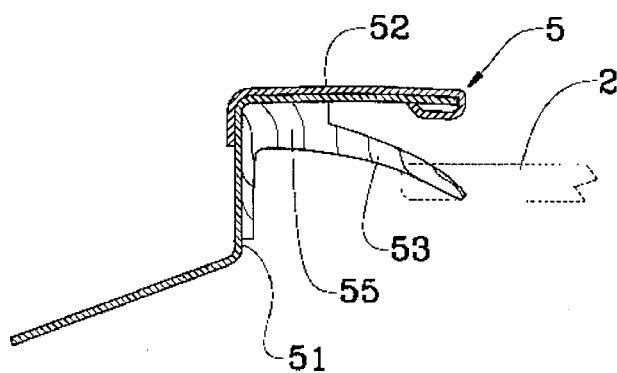
FIG. 6 is a sectional view of a window molding for a vehicle taken on line 6—6 of FIG. 2.
Figure 7:
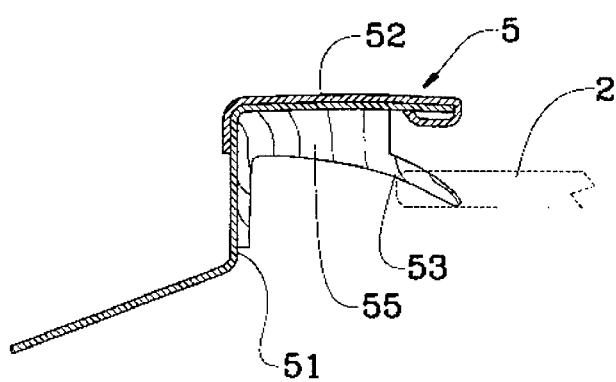
FIG. 7 is a sectional view of a window molding for a vehicle taken on line 7—7 of FIG. 2.

Referring to FIG. 1, a window glass 2 which is disposed in an opening 1a of a vehicle body 1 is fixed on the vehicle body by glue. A window molding 3 is disposed between periphery of the opening 1a and the window glass 2. The window molding 3 includes an upper window molding 4 of conventional construction and a pair of side window moldings 5 (one of which is shown in FIG. 1). The upper window molding 4 is connected with each of the side window moldings 5 at the corners of the window glass 2.

In FIGS. 2 to 8, the window molding 5 comprises a main portion 51 which can be formed, for example, of stainless steel, which is disposed between the vehicle body 1 and the window glass 2. The window molding 5 also comprises an ornament portion 52 which can be formed, for example, of resin, and connected with the main portion 51 along the length direction of the main portion 51. The main portion 51 covers between the vehicle body i and the vehicle window 2. The window molding 5 further comprises a lip portion 53, which can be formed, for example, of resin, and connected with the main portion 51 along the length of the main portion 51. The lip portion 53 holds the window glass 2 and forms a seal with the window glass 2. The main portion 51 of the window molding 5 is mounted on the vehicle body 1 by screws (not shown in FIGURES) through a weather strip 11. The lip portion 53 is gradually inclined to the direction of the ornament portion 52 according to a curve of the surface of the window glass 2 in the range A (shown in FIG. 2) from the bottom to an upper portion of the window molding 5. A groove 54 is disposed between the ornament portion 52 and the lip portion 53 along the length of the window molding 5. A projection portion 55 is disposed in the range B (shown in FIG. 2) of the groove 54 from the upper portion to the top portion of the window molding 5. The projection portion 55 is connected with the main portion 51 and gradually increased so as to fill the groove 54. Furthermore the window molding 5 comprises a connecting portion 56 at the top portion thereof which is connected with the upper window molding 4. The window molding 5 further comprises a protection portion 57 which is fixed on the vehicle body 1.

In accordance with the above description, because the lip portion 53 is gradually inclined according to the curve of the surface of the window glass 2, the lip portion 53 contacts the window glass 2 in all regions along the length of the window molding 5. Therefore the window molding 5 can seal completely between the vehicle body 1 and the window glass 2 without a gap therebetween and the window molding 5 prevents the leakage of rain water. Furthermore rain water which falls on the window glass 2 is moved sideward by wind generated as a result of forward movement of the vehicle and the water is drained downward through the groove 54. Therefore the window molding 5 can prevent the rain water from adhering to the side windows of the vehicle and going into the vehicle cabin through a gap between the vehicle body and the side window glass. The wind generated by forward movement of the vehicle goes into the groove 54. However, because the groove 54 is gradually filled with the projection portion 55 in the range B, the wind going into the groove 54 also goes out from the groove 54 through the projection portion 55. Therefore the noise which is generated when the window molding passes through the air is reduced.

Figure 9:
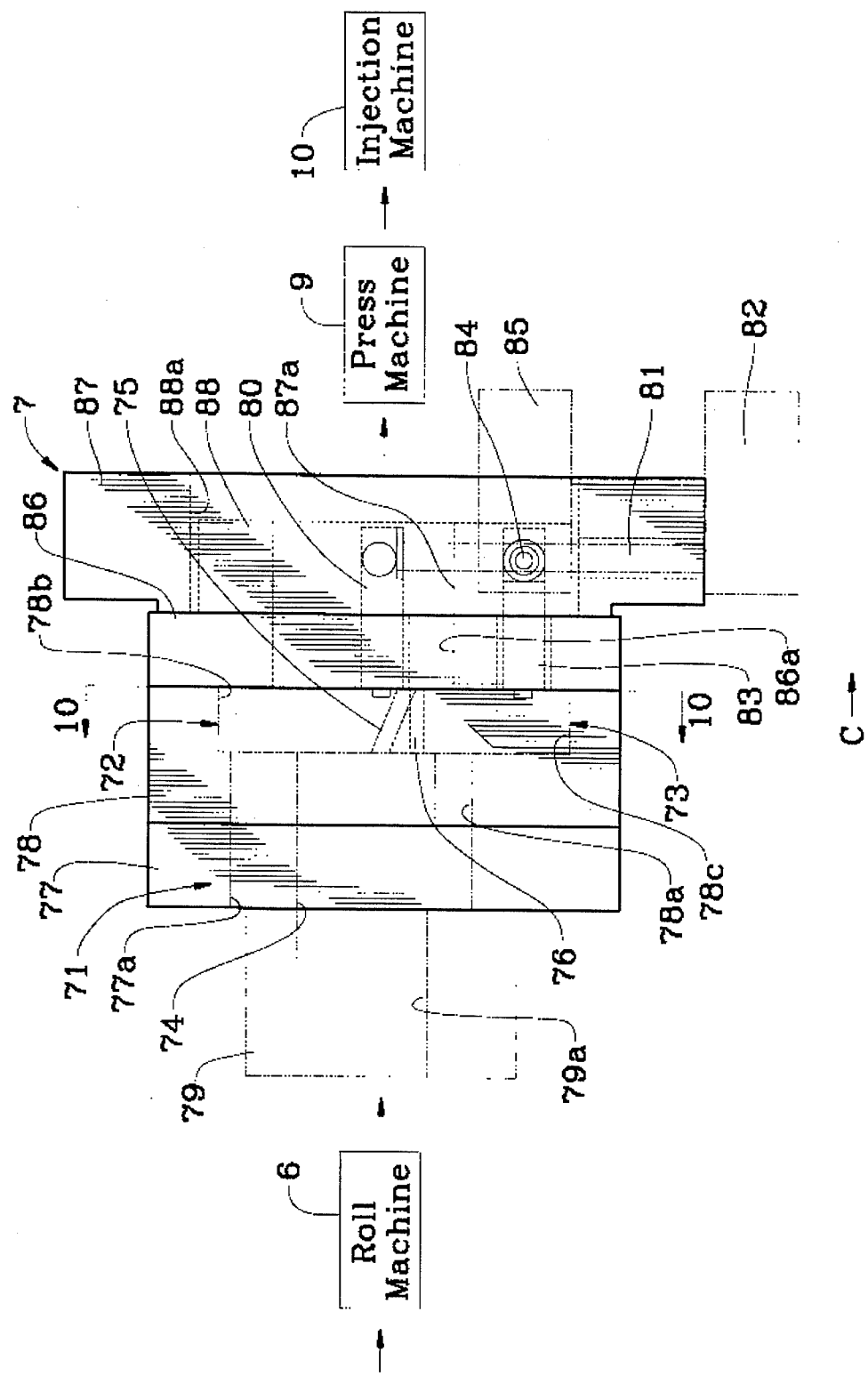
FIG. 9 is a plan view of a molding machine constructed in accordance with the present invention.
Figure 8:
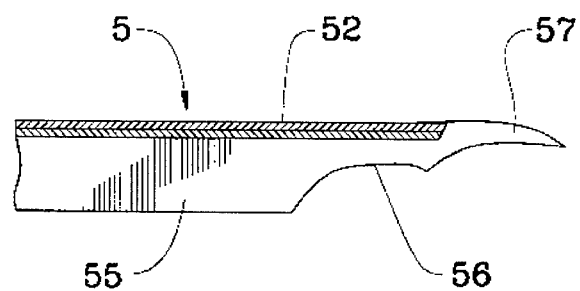
FIG. 8 is a sectional view of a window molding for a vehicle taken on line 8—8 of FIG. 2.

A molding machine which molds the window molding 5 will be described hereinafter. In FIG. 9 a molding machine 7 is disposed between a roll machine 6 forming the main portion 51 and a press machine 9 forming the connecting portion 56. The molding machine 7 extrudes the ornament portion 52, the lip portion 53 and the projection portion 55 so as to be connected with the main portion 51. An injection machine 10 forming the protection portion 57 is disposed after the press machine 9.

Figure 10:
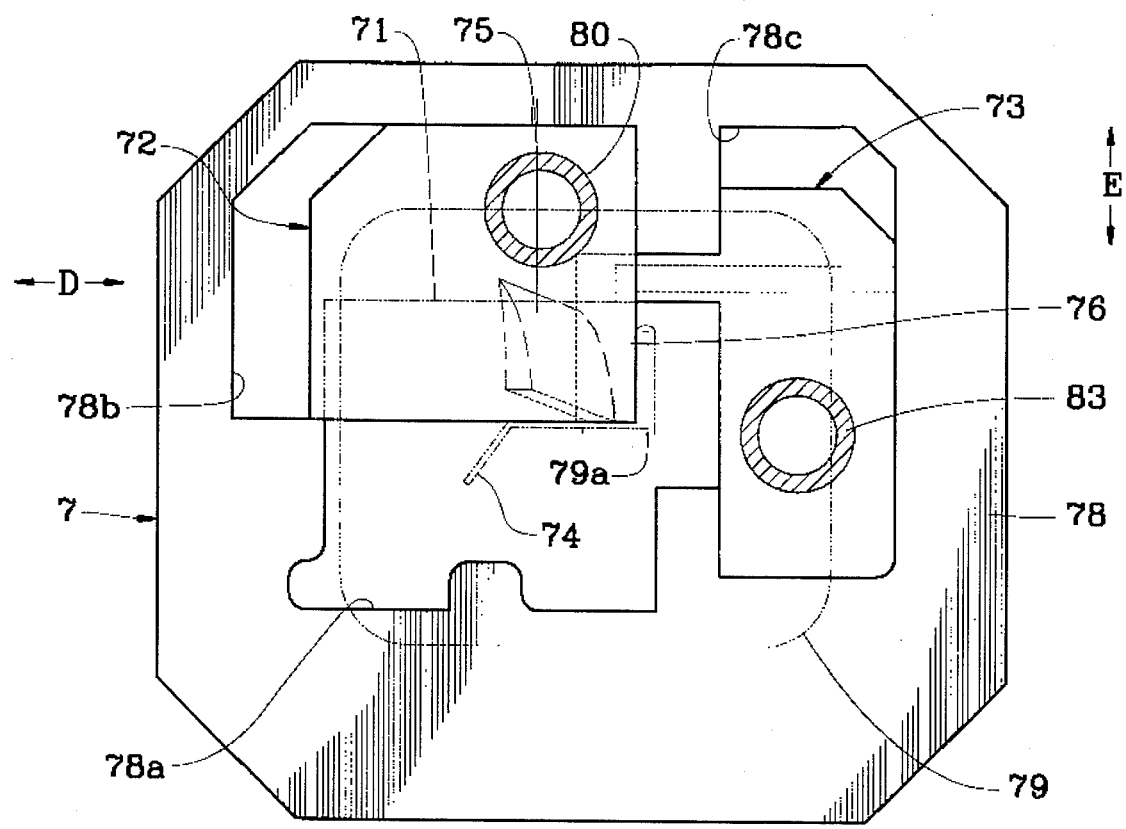
FIG. 10 is a sectional view of molding machine taken on line 10—10 of FIG. 9.

In FIGS. 9 and 10 the molding machine 7 comprises a main die 71, a first slide die 72 which is slidably movable in the direction of D shown in FIG. 10 and a second slide die 73 which is slidably movable in the direction of E shown in FIG. 10.

The main die 71 formed separately in the vertical direction of FIG. 9 includes a first cavity 74 which passes through the main die 71 in the direction of C (indicating the direction of the molding method) shown in FIG. 9. The first cavity 74 is used for extruding the ornament portion 52 so as to be connected with the main portion 51 and the first cavity 74 is shaped in the same configuration of the main portion 51 and the ornament portion 52. The first slide die 72 formed separately in the horizontal direction of FIG. 9 includes a second cavity 75. The second cavity 75 connected with the first cavity 74 is used for extruding the lip portion 53 so as to be connected with the main portion 51 and the second cavity 75 is shaped in the same configuration of the lip portion 53. The second slide die 73 includes a conduit 76 therein connected with the first cavity 74 near the second cavity 75. The conduit 76 is used for extruding the projection portion 55 so as to be connected with the main portion 51.

The first slide die 72 is connected with a first driving shaft 80. The first driving shaft 80 is connected with a first driving mechanism 82 constructed with a first motor and a first transforming mechanism (both of them are not shown in FIGURES) which transforms the rotational movement of the motor into a reciprocal movement through a first connecting rod 81. A second driving shaft 83 is fixed on the second slide die 73. The second driving shaft 83 is connected with a second driving mechanism 85 constructed with a second motor and a second transforming mechanism (both of them are not shown in FIGURES) which transforms the rotational movement of the second motor into a reciprocal movement through a second connecting rod 84.

A first guide dice 77 and a second guide dice 78 include supporting holes 77a and 78a respectively. The supporting holes 77a and 78a are shaped in the same configuration of the main die 71. The main die 71 is fit in the supporting holes 77a and 78a and supported by the first guide dice 77 and the second guide dice 78. The second guide dice 78 further includes supporting holes 78b and 78c connected with the supporting hole 78a. The first slide die 72 is fit into the supporting hole 78b so as to slide in the direction of D shown in FIG. 10. The first slide die 72 is supported by the second dice 78 so as to be contacted tightly with the main die 71. The second slide die 73 is fit into the supporting hole 78c so as to slide in the direction of E shown in FIG. 10. The second slide die 73 is supported by the second dice 78 so as to be contacted tightly with the main die 71. Furthermore a third guide dice 79 which is fixed tightly on the first guide dice 77 includes a guide groove 79a. The guide groove 79a shaped in the same configuration of the main portion 51 introduces the main portion 51 which is extruded by the roll machine 6.

The first guide dice 77 is fixed tightly on the second guide dice 78 and the second guide dice 78 is fixed tightly on a first supporting dice 86. The first supporting dice 86 is fixed on a second supporting dice 87 which supports the driving mechanisms 82 and 85. A third supporting dice 88 is disposed in the second supporting dice 87. In the third supporting dice 88, the first driving shaft 80 and the first connecting rod 81 are connected and the second driving shaft 83 and the second connecting rod 84 are connected. The driving shafts 80 and 83 pass through the first supporting dice 86 and the third supporting dice 88. The connecting rod 81 and 84 pass through the second supporting dice 87 and the third supporting dice 88. Furthermore the first supporting dice 86, the second supporting dice 87 and the third supporting dice 88 respectively include through holes 86a, 87a and 88a through which the window molding 5 which is extruded through the cavities 74, 75 and 76 passes.

A molding method which extrudes the window molding 5 of the invention will be described hereinafter. A stainless steel member is rolled into the main portion 51 by the roll machine 6. The main portion 51 is later processed by the molding machine 7.

The main portion 51 is set in the first cavity 74 guided by the guide groove 79a of the guide dice 79. The ornament portion 52 is formed with the main portion 51 from, for example, resin supplied to the first cavity 74 through a passage (not shown in FIGURES) provided in the first guide dice 77. Later the main portion 51 with the ornament portion 52 is set in the second guide dice 78. Because the first slide die 72 is slid in the direction D of FIG. 10 by driving of the first driving mechanism 82, the gradually inclined lip portion 53 is extruded from, for example, resin supplied to the second cavity 75 through passages (not shown in FIGURES) provided in the first guide dice 77 and the second guide dice 78 within the range A (shown in FIG. 2) of the main portion 51. Furthermore, because the second slide die 73 is slid in the direction E of FIG. 10 by driving of the second driving mechanism 85, the projection portion 55 is extruded from, for example, resin supplied to the conduit 76 through passages provided in the first guide dice 77 and the second guide dice 78 within the range B (shown in FIG. 2) of the main portion 51.

Subsequently, the main portion 51 with the ornament portion 52, the lip portion 53 and the projection portion 55 is cut by the press machine 9 and the connecting portion 56 is provided with the main portion 51. The protection portion 57 is formed with the main portion 51 by the injection machine 10. This results in completion of the window molding 5.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A window molding for a vehicle comprising:

a main portion having a first part for being disposed between a vehicle body and an edge of a side portion of a vehicle window and a second part extending from the first part so as to be positioned above an outer surface of the side portion of the vehicle window, the first part and the second part of the main portion being adapted to extend along the direction in which the side portion of the vehicle window extends;

an ornament portion disposed on the second part of the main portion so as to be in contact with the main portion;

a lip portion made of a material different from said main portion, said lip portion being connected to the first part of the main portion for being positioned between the second part of the main portion and the outer surface of the side portion of the vehicle window, the lip portion extending along a full length of the direction of extent of the second part of the main portion so as to define a groove between the lip portion and the second part of the main portion, said groove having oppositely located first and second end portions disposed with respect to the longitudinal extent of the groove, said lip portion being gradually inclined along its longitudinal extent from a first point to a second point so that the lip portion gradually approaches the second part of the main portion and gradually reduces the width of the groove from the first point to the second point and so that the lip portion has a curvature which substantially coincides with a curvature of the outer surface of the side portion of the vehicle window which is to be engaged by the lip portion; and a projection portion made of material different from said main portion, said projection portion being disposed in the groove beginning adjacent said second point and extending toward the second end portion of the groove, said projection portion progressively filling said groove in a direction away from said first end portion to progressively reduce the depth of the groove.

2. A window molding for a vehicle as recited in claim 1, wherein the main portion is formed of stainless steel, the ornament portion is formed of resin material, the lip portion is formed of resin material and the projection portion is formed of resin material.

* * * * *